United States Patent Office 3,453,369
Patented July 1, 1969

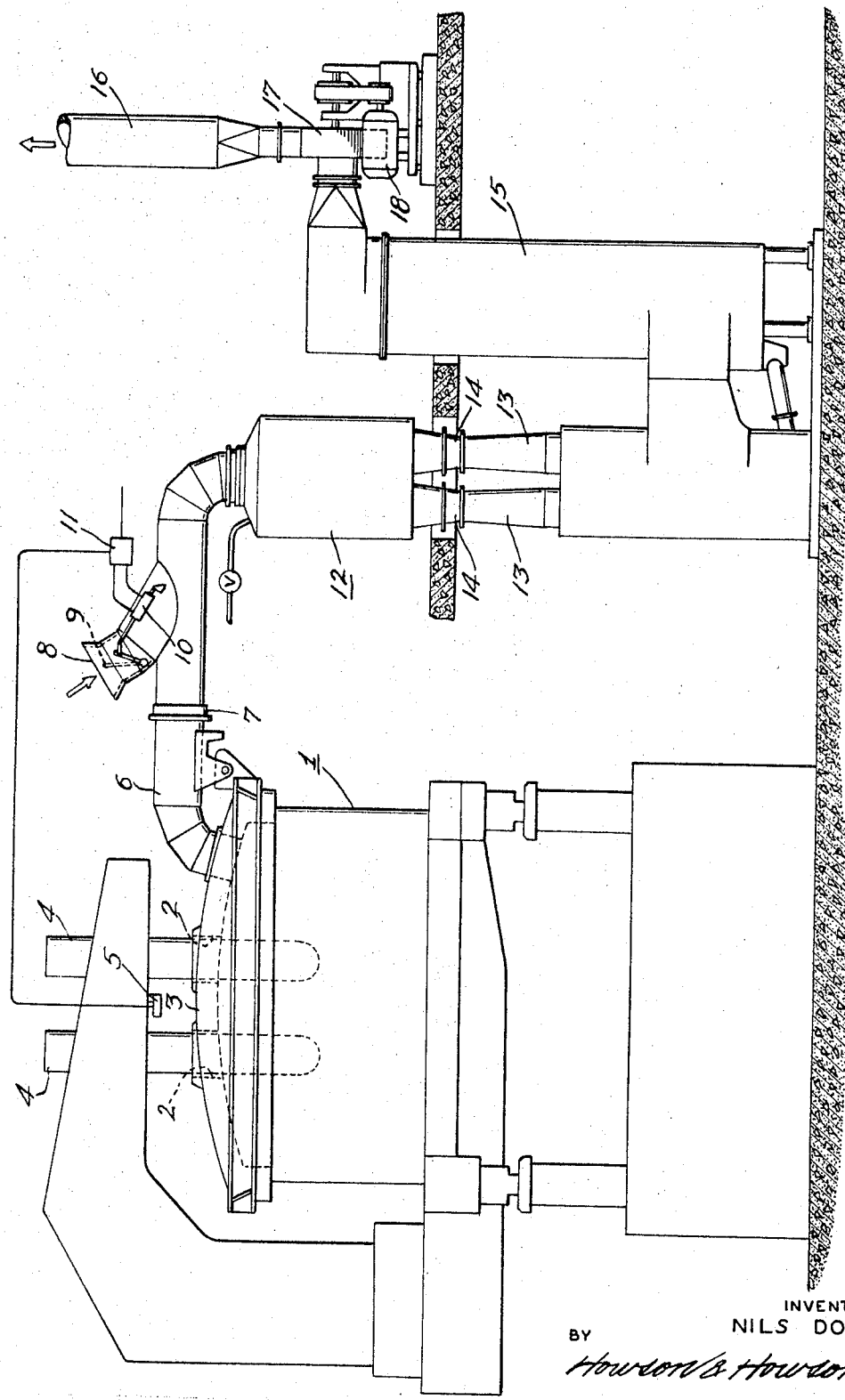

3,453,369
DEVICE FOR THE EXHAUST OF FLUE GASES FROM ARC MELTING FURNACES
Nils Dock, Saltsjo-Duvnas, Sweden, assignor to Aktiebolaget Svenska Flaktfabriken, Stockholm, Sweden
Filed June 2, 1967, Ser. No. 643,125
Claims priority, application Sweden, July 29, 1966, 10,315/66
Int. Cl. F24d 12/00
U.S. Cl. 13—1                                    3 Claims

ABSTRACT OF THE DISCLOSURE

A device for controlling the exhaust of flue gases from an oxygen-injected electric melting furnace having an exhaust duct connected at one end to the arch of the furnace and at the other end to an exhaust fan which discharges the gases through suitable air-cleaning devices. An air inlet is provided in the duct intermediate the arch and the fan to introduce diluting fresh air into the flue gas and thereby control the amount of flue gas exhausted by the fan, and the air inlet is controlled by a smoke detector, preferably in the form of a photoelectric cell, adjacent the electrode lead-in openings in the arch to maintain the flue gas leakage out through the openings at the desired level.

---

The present invention relates to a device for the exhaust of flue gases from arc melting furnaces, preferably oxygen injected electric melting furnaces, which device comprises an exhaust duct connected to the furnace arch and extending to an exhaust fan, preferably via a gas cleaner connected therebetween, and means for adjusting the exhausted flue gas amount.

In furnaces of the aforesaid type it is of importance to adjust as closely as possible the exhausted flue gas amount to the actual gas development. Too small an exhaust involves an undesirable leakage of flue gases into the surrounding room with the inconveniences resulting therefrom, while in the case of too strong an exhaust air is sucked in from the room through the electrode lead-ins and thereby speeds up the combustion of the electrodes. Moreover, too strong an exhaust jeopardizes the possibility of maintaining a flue gas layer below the furnace arch as a protection against radiation, which layer contributes to a longer service life of the arch.

For an automatic control of the exhausted flue gas amount and for adjusting it to the actual demand, use was made heretofore of a pressure sensitive means placed below the furnace arch and adapted to control the amount adjusting device. It has proved difficult, however, a.o. owing to clogging caused by splashes from the molten bath, to make such an impulse means to work in the desired manner and with sufficient sensitivity.

The present invention has as its object to eliminate the aforesaid difficulties and to produce a simple but effective impulse means for amount control. The invention is characterized in that it comprises a smoke detector for the automatic control of the aforesaid adjusting means, which detector is an optical instrument, for example a photoelectric cell located above the electrode lead-ins and adapted upon variations from a set value of the concentration of flue gases leaking out at this place to actuate a manoeuvring means for said adjusting means so as to effect an increase or decrease of the exhausted flue gas amount according to the actual demands.

The invention offers the possibility of continuously adjusting the exhausted flue gas amount such as to maintain in the furnace a slight constant over-pressure with a controlled minimum gas leakage at the electrode lead-ins and to maintain a protective gas layer below the furnace arch.

The invention will now be described in a greater detail in the following with reference to the accompanying drawing, which shows a furnace plant equipped with an exhaustion device according to the invention.

In the drawing, 1 designates an electric furnace, the arch 3 of which is provided with lead-in openings 2 for the electrodes 4. To said furnace arch 3 is connected a duct 6 for the exhaustion of flue gases, which duct in the embodiment shown extends to a gas cleaner 12 designed as a wet cleaner comprising a number of venturi tubes 13 for disintegrating the washing liquid and admixing it to the gas. The clean gas, subsequent to its passing through a drip separator 15 connected to the gas cleaner, is blown out through a duct 16 with the aid of a fan 17 driven by a motor 18. For controlling the exhausted gas amount, the exhaust duct 6 in the embodiment shown is provided with a fresh air inlet 8 for admitting a greater or smaller amount of dilution air, which amount is controlled by a damper 9. For the automatic control of said damper, according to the invention a smoke detector 5 (photoelectric cell or the like) is mounted above the electrode lead-ins and adapted upon variations from a set value of the concentration of the flue gas leaking out at this place to actuate via a relais 11 a manoeuvring means for the damper 9.

The exhausted flue gas amount may, of course, also be adjusted by means other than said damper 9, without abandoning the inventive idea. The dilution air, for example, may be introduced into the exhaust duct 6 through a gap at the jointing sleeve 7 in such a manner that upon displacing said sleeve the width of the gap and thereby the amount of the dilution air admitted is adjusted. The amount control may also be effected by changing the flow area in the narrowest section (throat) 14 of the venturi tubes 13 or by controlling the speed of the exhaust fan 17.

I claim:
1. A device for exhausting flue gases from arc melting furnaces having a furnace arch with electrode lead-in openings, comprising an exhaust duct connected to the furnace arch, an exhaust fan connected thereto, means for adjusting the amount of flue gas exhausted by said fan, and a smoke detector in the form of an optical instrument located adjacent the electrode-lead-in openings and adapted upon variations from a set value of the concentration of flue gases leaking out of said openings to actuate automatically said adjusting means to increase and decrease the amount of exhausted flue gas according to the actual demand.
2. A device according to claim 1 wherein said optical instrument is a photoelectric cell.
3. A device according to claim 1 wherein said adjusting means comprises an adjustable fresh-air inlet in said duct intermediate said arch and said fan.

References Cited
UNITED STATES PATENTS 3,173,980   3/1965   Hysinger _____ 13—31 X
3,376,425   4/1968   Kraus et al. _____ 250—218 X BERNARD A. GILHEANY, *Primary Examiner.*
R. N. ENVALL, JR., *Assistant Examiner.*

U.S. Cl. X.R.
98—115; 250—215, 218; 356—207